United States Patent Office 3,804,757
Patented Apr. 16, 1974

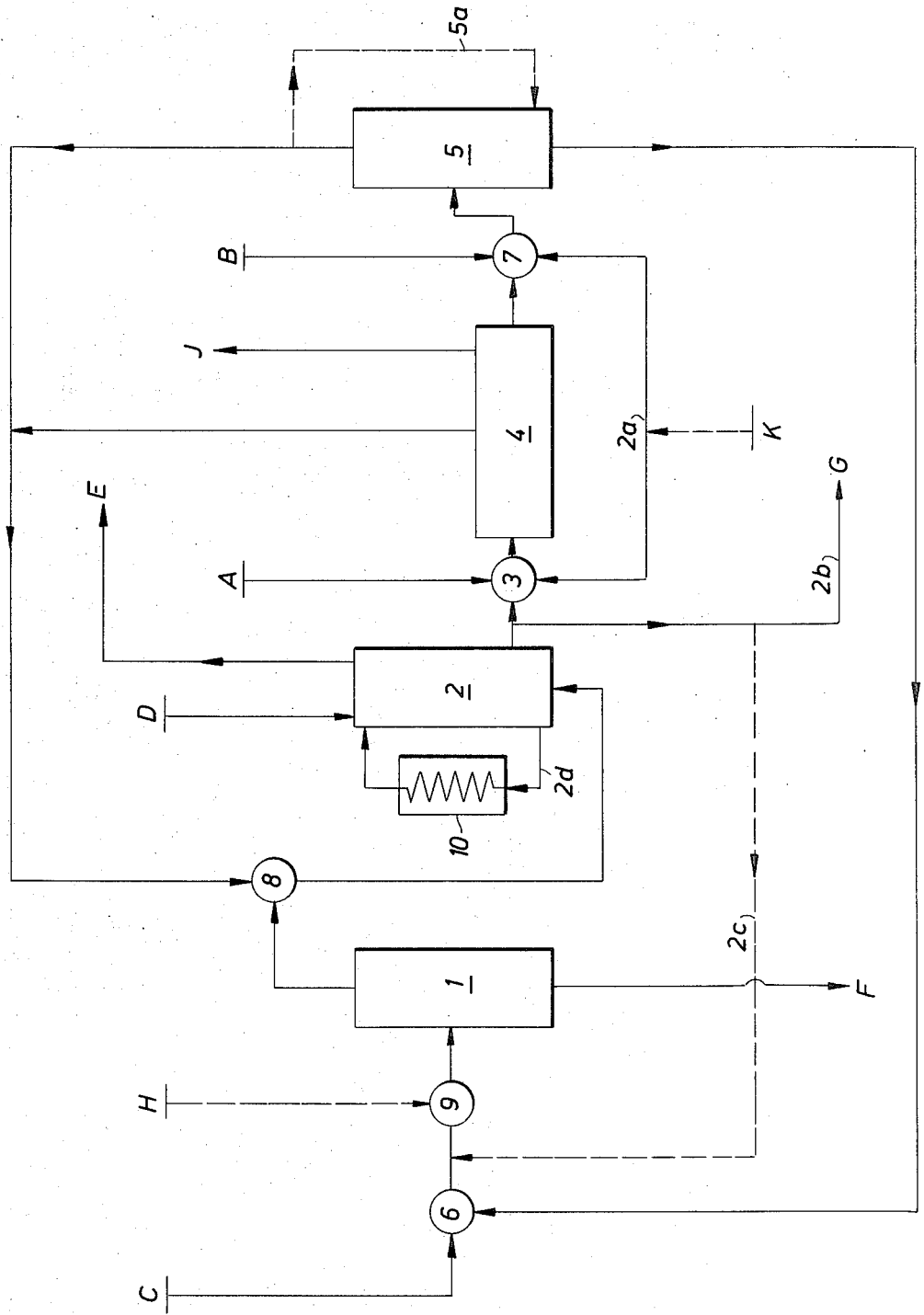

3,804,757
PROCESS FOR TREATING WASTE WATER FROM INDUSTRIAL PROCESSES
Ernst Ruschenburg, Moers, Germany, assignor to Deutsche Texaco Aktiengesellschaft, Hamburg, Germany
Filed Apr. 24, 1972, Ser. No. 247,123
Claims priority, application Germany, May 11, 1971,
P 21 23 218.8
Int. Cl. C02b 1/18
U.S. Cl. 210—59                                        5 Claims

ABSTRACT OF THE DISCLOSURE

A process for treating contaminated waste water from manufacturing processes is disclosed. The water contains, for example, hydrogen sulfide, ammonia and phenol in the presence of non-volatile and strongly alkaline ions. An ammonium salt of a strong mineral acid such as ammonium sulfate is added to the contaminated waste water and the ammonia and hydrogen sulfide are stripped away. The phenol separates as an oily layer and may be removed. The ammonium sulfate needed for the process may be generated during the process by treating the stripped ammonia with sulfuric acid.

BACKGROUND OF THE INVENTION

This invention pertains to the field of industrial waste water treatment.

In refineries, coking plants or in similar manufacturing complexes, aqueous condensates and wash liquids occur as waste waters. The waste generally results from the treatment of crude oil or of crude oil products or from scrubbing gases, valuable carbon material, and petrochemical conversion products with water and aqueous alkaline (caustic) solutions. Sulfur compounds such as hydrogen sulfide, mercaptans and thiophenols; nitrogen compounds such as ammonia, amines as well as carboxylic acids, phenols, etc., form the most important components of these waste waters. Generally, waters containing contaminants such as hydrogen sulfide, mercaptans and ammonia are referred to as sour water. Also, spent caustic (potassium or sodium hydroxide) solutions often contain phenols as well as carboxylic acids.

Before the waste waters may be disposed of, the contaminating materials must be removed to comply with applicable regulation pertaining to the quality of effluent streams.

It is known in the art that ammonia and hydrogen sulfide and mercaptans may be separated from waste waters by stripping and vapor liberation by heating and if necessary by the introduction of circulating stripping gas. The expelled vapors are then either burned or are converted to utilizable compounds such as sulfur, sulfuric acid, ammonia water and ammonium sulfate. When separating the ammonia from sour water by ion exchange before stripping a substantially ammonia free hydrogen sulfide containing stripped gas is obtained which is technically easily convertible to sulfur or sulfuric acid. Also, a separate recovery of hydrogen sulfide and ammonia from said sour water is possible by extraction distillation but these processes are very complex and susceptible to contamination and, therefore, do not for a certainty achieve a complete removal of hydrogen sulfide and ammonia from waste waters. Spent caustic is most often separately collected from other waste waters and, if necessary, is prediluted with sulfuric acid before stripping which may be accomplished together with the stripping of the sour water. At this point large portions of weak organic acids hereinafter called phenols are obtained in the form of an oily layer. In order to assist the phenols separation from the spent caustic solutions and for the prestripping operation, occasionally refinery gases are additionally passed through the mixture. It is also known to introduce carbon dioxide containing gases, for example, flue gases in order to assure that the phenols are freed and mechanically separable before sulfuric acid is added. The subsequent complete hydrogen sulfide separation from said spent caustic in the stripping process requires, however, that sulfuric acid be added in the same amount as necessary without carbon dioxide treatment and accordingly the pH value is reduced to about 4 or 5. Extreme corrosion occurs at this pH level, and only extremely expensive working materials will resist this corrosive mixture.

It is also known to oxidize the sulfides in spent caustic solutions at a highly alkaline range and at a higher temperature and higher pressure with the aid of oxygen. This process, however, is very complex and does not lead to the separation of components of said spent caustics, nor does it lead to their direct utilizability or complete recovery but normally only to a conversion of hydrogen sulfide to thiosulfate which is very disrupting to biological waste water treatments because of the high chemical oxygen demand (COD) of thiosulfates. The neutralization and the acidification of spent caustics is accomplished in practice continuously or batchwise under the aid of automatically adjusted dosing units. As the composition of said spent caustics, however, shows quick changes, and said spent caustics behave besides that like complex buffer systems said dosing units though under instrumentation control are not sufficiently reliable. Due to overdosing mineral acids, considerable corrosion damage often occurs while underdosing leads to an incomplete hydrogen sulfide stripping. It is now an object of this invention to conduct the treatment of sour water and spent caustic solutions continuously either separately or combined, whereby the treated waste water has an optimum pH value and the contents of hydrogen sulfide of mercaptans and also of ammonia, as well as the chemical oxygen demand as a measure for the content of oxidizable substances are at acceptable levels.

SUMMARY OF THE INVENTION

The invention is a process for separating weak volatile inorganic and organic acids, ammonia from aqueous solutions may be carried out by adding an amount of ammonium salt of a strong mineral acid equivalent to that of base alkalinity titratable against methyl-orange, reduced by the ammonia alkalinity, and then removing the said weak volatile inorganic acids and ammonia by stripping and the weak volatile organic acids by mechanical means after phase separation.

DESCRIPTION OF THE PREFERRED EMBODIMENTS

It has been found that a separation of weak volatile inorganic and organic acids and of ammonia contained in sour water in spent caustic solutions may be carried out by adding ammonium salts of strong mineral acids.

Ammonium salts of strong mineral acids, especially of sulfuric acid, are added to the sour water and spent caustic solutions. The quantity of the added ammonium salt is equivalent to that of base alkalinity titratable against methyl-orange, reduced by the ammonia alkalinity. The separation is carried out in a two stage process. The spent caustic solution is partially stripped and after that, the so treated spent caustic solution combined with the sour water is stripped.

It has been found that the liberation of phenols can be effected by adding ammonium salts to spent caustic solutions. Here, also, the quantity of ammonium salt, for example, ammonium sulfate to be employed is equivalent to that of base alkalinity titratable against methyl-orange reduced by ammonia alkalinity. The phenol separation is effected mechanically and there is no violent exothermic reaction in contrast to the known sulfuric acid addition techniques. Concerning the phenol separation, a predilution is not necessary, neither is the aid of foreign gases. Furthermore, said weak inorganic acids, for instance, hydrogen sulfide, which otherwise cannot be separated by simple stripping because they are bound with non-volatile and strongly alkaline ions, for instance, sodium ions are directly strippable because of the ammonium sulfate additive. Overdosing of ammonium sulfate additive can be compensated by adding sodium hydroxide or the like. Also, the total ammonia content of said spent caustic solutions including that added as salt is strippable.

According to another embodiment of the process of the invention, the hydrogen sulfide content of sour water is completely strippable by adding a similar quantity of ammonium sulfate. If the sour water shows degrees of carbonate hardness ammonium sulfate additive here also allows an otherwise difficult complete stripping of hydrogen sulfide.

The ammonium salt, ammonium sulfate for example, necessary for the process of the invention, can either be introduced into the cycle or be produced directly through reacting the ammonia component contained in said sour water and/or said spent caustic with sulfuric acid. Especially suitable for the process of the invention are ammonium salts of sulfuric acid, hydrochloric acid and phosphoric acid, the latter especially in the form of diammonium phosphates. The process of the invention should be carried out at a pH now below 7 so that no corrosion problems will occur.

The process of the invention may be better understood by referring to the drawing which is a preferred embodiment of the process wherein the treatment of spent caustics is combined with the treatment of sour waters in a continuous process. Other embodiments may be easily formulated from the teachings of this invention, and the description of this embodiment is not intended to in any way limit the scope of the invention.

Sour water C is treated in the stripper 1 in the manner known in the art. The vapors leaving the stripper 1 overhead are scrubbed free of ammonia in countercurrent flow in a scrubbing unit 2 with a strong mineral acid, for example, sulfuric acid D. Herein, an ammonium sulfate solution concentrated as much as possible is produced which is recycled in 2D by the heat exchanger 10 onto the head of the absorber 2. Overhead product E now free of ammonia substantially comprises hydrogen sulfide which can be processed in any manner known in the art to sulfur or sulfuric acid. The ammonium sulfate solution from said scrubbing unit 2 is mixed with phenol containing spent caustic A at 3 and is introduced into the settler 4. During the starting operation this quantity can, if necessary, be supplemented from stock or by additional purchase 2A.

In said settler 4 said phenols separate as an oily upper layer and can be continuously mechanically withdrawn J. The aqueous lower layer discharging at the bottom of the settler 4 can, if necessary, be mixed with the present phenol poor or phenol free caustic B at the 7 and can be passed to the stripper 5. The vapors escaping and being stripped from 4 and 5 and substantially consisting of ammonia, hydrogen sulfide and mercaptans are recycled at 8 into the sulfuric acid in the scrubbing unit 2. The bottoms product of said stripper 5 is mixed with sour water at 6 and is processed in said stripper 1 where it is completely freed of hydrogen sulfide, mercaptans and ammonia said bottoms product F of said stripper 1 now represents the treated waste water. Ammonium sulfate solution G from said scrubbing unit 2 which is not required for the continuous operation for stripping of hydrogen sulfide and ammonia may be withdrawn to B from the bottom of said scrubbing unit 2 and can be further processed, utilized or destroyed according to prior art methods. Problems occurring, for instance, through miscontrolled overdosing of ammonium salts may be easily corrected by adding an equivalent quantity of a nonvolatile base, for example, caustic soda solution H to the sour water stripper charge at 9. Such a correction though is not required if a corresponding $NH_4^+$ content in the treated waste water is not harmful but rather beneficial or necessary to any following biological treatment. If such disturbances should occur in said sulphuric acid scrubbing unit 2 in that a higher content of free sulfuric acid is noticed between 2 and 5, this cause of disturbance can be compensated by recycling ammonia containing stripped vapours of stripper 5 via 5a into the same 2. The process of the invention can also be separately applied to spent caustic solutions and to sour water solutions. As is very often the case, however, both kinds of waste waters are obtained from a single plant for industrial process. It is preferred, therefore, to combine said treatments where possible in the aforementioned manner, thereby both the strippers 2 and 5 and the settler 4 are operated such that the pH value of the mixture does not decrease below 7 due to the optimum ammonium sulfate additive so that corrosion of the unit parts may certainly be avoided. Since thiosulfates may be formed through air access to said spent caustic solutions and in the very often alkaline reacting sour waters, it is preferred to operate the process by preventing air from entering into said spent caustic solutions and sour waters before treatment. Continual or occasional spent caustic contents or carbonate hardness in said sour water is neutralized by equivalent ammonium salt additions, for instance, via 2C to said stripper 1.

EXAMPLE

The operation of the process of the drawing

Charge the stripper 1 via 9 with 10 meters$^3$/hour sour water C (contents: 1.534 grams/liter hydrogen sulfide and 0.920 grams/liter ammonia).

Charge the absorber 2 with 110.4 kilograms sulfuric acid/hour (calculated as 100 percent sulfuric acid). A source of about 40 percent sulfuric acid is to be present at D.

Charge the settler 4 via 3 with
(a) 0.1 meter$^3$/hour, spent caustic from A (contents: 67.8 grams/liter $Na^+$, 2.727 grams/liter ammonia, 47.65 grams/liter phenols and sulfide ions corresponding to 22.27 grams/liter hydrogen sulfide),
(b) 28 kilograms/hour ammonium sulfate. (A 40 weight percent ammonium sulfate solution K is to be introduced via 2A.)

Charge the pre-stripper 5 via 7 with
(a) 0.9 meter$^3$/hour spent caustic B (contents: 67.8 grams/liter $Na^+$ and sulfide ions corresponding to 22.67 grams/liter of hydrogen sulfide),
(b) 252 kilograms/hour ammonia sulfate. (A 40 weight percent ammonium sulfate solution K is to be troduced via 2A.)

Said settler 4 and said pre-stripper 5 are charged with the spent caustic solutions A and B respectively as well as with the ammonium sulfate solutions. The lower effluent of said settler, mixer 4 is also passed via 7 to said pre-stripper 5. The outlet of said absorber 2 remains closed at that point of time. The effluent of 5 is now stripped via 6 together with said sour water charge C in 1. Said stripper vapors together with the spontaneous escaping gases from 4 and 5 substantially consisting of ammonia and hydrogen sulfide are passed via 8 to said absorber 2 where they are practically completely set free of ammonia by said sulfuric acid additive D. The resultant ammonium sulfate solution is recycled via 2D via said heat exchanger 10 onto the head of said absorber 2. By respectively cooling and heating in said heat exchanger 10 the concentration of said ammonium sulfate solution is finally adjusted to 40 weight percent. The resultant properly concentrated solution is continuously removed through 2B to G either as slop or for stock. After such a startup the ammonium sulfates supply to 4 and 5 from K is changed over to the supply from the effluent of said absorber 2. Only the excess portion of ammonium sulfate solution will then be removed through 2B to G. During continuous operation the following products per hour are obtained from 2: 47.5 kg. hydrogen sulfide (calculated as dry gas) and 371.8 kg. 40 weight percent ammonium sulfate solution where from 91.8 kg. are withdrawn as excess. From 4, 4 kg. phenols are continously removed at J. From 1, 10–11 m.$^3$ treated waste water F with the content of 120.4 kg. sodium sulfate (about 11 grams sodium sulfate per liter). The waste water F is free of ammonia and hydrogen sulfide and has a pH value of about 7.

I claim:

1. A process for separating hydrogen sulfide, ammonia and phenolic compounds from waste water, which comprises:
    (a) stripping the hydrogen sulfide and ammonia from said waste water,
    (b) treating the stripped hydrogen sulfide and ammonia with sulfuric acid to form ammonium sulfate and release hydrogen sulfide,
    (c) removing the freed hydrogen sulfide,
    (d) mixing a portion of the ammonium sulfate solution from (b) with an aqueous caustic solution of phenolic compounds in a vessel causing the phase separation of the phenolic compounds which may then be removed.

2. The process of claim 1 wherein the amount of ammonium sulfate solution used in (d) is equivalent to the base alkalinity titratable against methyl-orange, reduced by the ammonia alkalinity.

3. A process comprising:
    (a) stripping hydrogen sulfide and ammonia from waste water,
    (b) scrubbing the stripped hydrogen sulfide and ammonia with sulfuric acid whereby ammonium sulfate is formed,
    (c) mixing said ammonium sulfate with an aqueous phenol containing spent caustic to effect physical separation of the phenol.

4. The process of claim 3 wherein the amount of ammonium sulfate solution used in (c) is equivalent to the base alkalinity titratable against methyl-orange, reduced by the ammonia alkalinity.

5. The process of claim 3 wherein bottoms product from step (c) is recycled to the stripping step of (a) in order to remove any additional dissolved gases and overhead product from step (c) is recycled to the scrubber of step (b) to remove any free ammonia.

References Cited

UNITED STATES PATENTS

| 3,097,065 | 7/1963 | Gollmar | 55—70 |
| 3,335,071 | 8/1967 | Bollen et al. | 55—70 |
| 3,292,345 | 12/1966 | Wunderlich et al. | 55—70 |

FOREIGN PATENTS

| 699,453 | 11/1953 | Great Britain. |

CHARLES N. HART, Primary Examiner

B. CASTEL, Assistant Examiner

U.S. Cl. X.R.

55—70